United States Patent [19]

Meier et al.

[11] Patent Number: 5,106,906
[45] Date of Patent: Apr. 21, 1992

[54] PROCESS FOR THE PRODUCTION OF FINELY DISPERSED POLYMER MIXTURES

[75] Inventors: Erich Meier, Leverkusen; Hanns-Ingolf Paul, Cologne; Rüdiger Plaetschke; Günther Weymanns, both of Leverkusen, all of Fed. Rep. of Germany

[73] Assignee: Bayer Aktiengesellschaft, Leverkusen, Fed. Rep. of Germany

[21] Appl. No.: 411,082

[22] Filed: Sep. 22, 1989

[30] Foreign Application Priority Data

Sep. 30, 1988 [DE] Fed. Rep. of Germany ....... 3833219

[51] Int. Cl.$^5$ ................................................ C08J 3/00
[52] U.S. Cl. ...................................... 525/51; 525/148; 525/197; 525/198; 528/483
[58] Field of Search ............... 525/148, 197, 198, 51; 528/483

[56] References Cited

U.S. PATENT DOCUMENTS

| 4,598,006 | 7/1986 | Sand | 523/340 |
|---|---|---|---|
| 4,745,029 | 5/1988 | Kambour | 525/148 |
| 4,820,752 | 4/1989 | Berens | 523/122 |
| 4,990,595 | 2/1991 | Traechkner | 528/483 |

FOREIGN PATENT DOCUMENTS

| 0166820 | 1/1986 | European Pat. Off. . |
|---|---|---|
| 0265946 | 5/1988 | European Pat. Off. . |
| 0356815 | 3/1990 | European Pat. Off. . |

1548978 7/1979 United Kingdom .

OTHER PUBLICATIONS

B. J. Schmitt, Ber. Bunsenges, Phys. Chem. 89 (1983), p. 113 et seq.
Ottenbrite, Utracki, Inoue Eds., Current Topics in Polymer Science, vol. II, 1987.
David C. Bonner, Polymer Engineering and Science, Feb. 1977, vol. 17, No. 2, pp. 65-72.
Sanat K. Kumar, Sanjay P. Chhabria, Robert C. Reid and Ulrich W. Suter, 1987 American Chemical Society, Macromolecules 1987, 20, 2550–2557.

*Primary Examiner*—John C. Bleutge
*Assistant Examiner*—David Buttner
*Attorney, Agent, or Firm*—Joseph C. Gil; Aron Preis

[57] ABSTRACT

37 Highly dispersed mixtures of at least two polymers which are not completely miscible in the melt under customary conditions are produced by melting the polymers used in the presence of supercritical gases or mixtures of gases, intensively thoroughly mixing the molten polymers for long enough until the viscosity of the melt has diminished by at least 10%, subsequently cooling the polymer melt with further thorough mixing, until the viscosity of the melt has at least reached the original value again and then depressurizing the polymer melt. The highly dispersed mixtures produced in this way can be processed in the customary manner into mouldings.

4 Claims, No Drawings

PROCESS FOR THE PRODUCTION OF FINELY DISPERSED POLYMER MIXTURES

The invention relates to a process for the production of highly dispersed mixtures of at least two polymers which are not completely miscible in the melt under customary conditions and the use of the highly dispersed mixtures for the production of mouldings.

It is known to produce mixtures of polymers which are not completely miscible in the melt under customary conditions, in finely dispersed form by mechanically mixing the components using suitable mixing equipment, such as kneaders or extruders, with considerable effort, for example by bringing particularly high shear zones into effect. Other processes are based on dissolving the polymers of one component in the monomers of the other component and subsequently polymerizing. Finally, it is known to cast or also to precipitate incompatible polymers from a common solution (see, for example, B. J. Schmitt, Ber. Bunsenges. Phys. Chem 89, (1983), p. 1133 et seq. or Ottenbrite, Utracki, Inoue Eds.: Current Topics in Polymer Science, Vol. II, Rheology and Polymer Processing/Multiphase Systems, Hanser Publishers, Munich 1987).

The known processes for the production of finely dispersed polymer mixtures have the disadvantage, however, that the mechanical mixing occurs at high temperatures, which can lead to undesired secondary reaction or can damage the polymers. The solvent processes require elaborate reaction control and the removal of organic solvents which, as residual solvents, cause a range of disadvantageous effects, such as reduced stress cracking resistance, in the blend.

A process has now been found for the production of highly dispersed mixtures of at least two polymers which are not completely miscible in the melt under customary conditions, which is characterized in that the polymers used are melted in the presence of supercritical gases or mixtures of gases, the molten polymers are intensively thoroughly mixed for long enough until the viscosity of the melt has diminished by at least 10%, the polymer melt is subsequently cooled with further thorough mixing, until the viscosity of the melt has at least reached the original value again and then the polymer melt is depressurized.

Plastics and elastomers are generally suitable as polymers which are not completely miscible in the melt under customary conditions. The polymers may be amorphous or partially crystalline. The polymers may be linear, branched or cross-linked. Their tacticity may be isotactic, syndiotactic or atactic as desired. They may comprise several components and thus, for example, be block copolymers, random copolymers or graft copolymers. The molecular weight may also vary within a very wide range. Thus both oligomers and high molecular and ultra-high molecular materials can be used.

Suitable polymers are thus, for example, those from the category of polycarbonates, polyolefins, polystyrenes, polyhaloolefins, polyvinyls, polyethers, polyacrylates, polyalkyl methacrylates, polydienes, polyepoxides, polyesters, polyester carbonates, polyamides, polyarylenes, such as polyarylene sulphides, polyarylene ketones, polyarylene sulphones, polyketones, polysulphones, polyimides, polyether esters, polybutadienes, natural rubber, polyurethanes, thermotropic and lyotropic liquid-crystalline polymers, polychloroprenes and polysiloxanes (see, for example, D.W. va Krevelen, Properties of Polymers, Correlations with Chemical Structure, Elsevier Publishing Company, Amsterdam 1972, for example Appendix 2, p. 386 et seq.). Polymers which are conductive (optionally by doping) and polyelectrolytes are also suitable.

Preferred polymers from those mentioned are polycarbonates based on diphenols, terephthalic acid and/or isophthalic acid, carbon dioxide, chain terminators and optionally chain branching agents, in which the ratio of carbonate structures to aromatic dicarboxylic ester structures is between 10 mol % to 90 mol % and 40 mol % to 60 mol %, in each case relative to the molar sum of carbonate and dicarboxylic ester structures. These polyester carbonates are described, for example, in EP-OS 0,036,080.

Furthermore, aliphatic thermoplastic polyesters are preferred, polyalkylene terephthalates being particularly preferred. Those of this type are, for example, polyalkylene terephthalates based on ethylene glycol, 1,3-propanediol, 1,4-butanediol, 1,6-hexanediol and 1,4-bis(hydroxymethyl)cyclohexane (see, for example, U.S. Pat. Nos. 2,647,885, 2,643,989, 2,534,028, 2,578,660, 2,742,494 and 2,901,466).

Moreover, liquid-crystalline aromatic polyesters based on optionally substituted p-hydroxybenzoic acid, optionally substituted isoterephthalic acid and/or terephthalic acid, optionally 2,7-dihydroxynaphthalene, optionally 3-chloro-4-hydroxybenzoic acid, optionally dihydroxydiphenyl sulphides and other diphenols (EP-OS 0,131,846, EP-OS 0,132,637 and EP-OS 0,134,959) are preferably suitable.

Thermoplastics made from thermoplastic polyalkyl (meth)acrylates are moreover preferred, poly($C_1$-$C_4$-alkyl methacrylates) being particularly suitable, i.e. polymers, for example, of methyl methacrylate, ethyl methacrylate, propyl methacrylate or butyl methacrylate. These are understood to include both homopolymers and copolymers of these methacrylates.

Moreover, linear and branched polyarylene sulphides are preferred with structural units of the general formula (I)

in which
—Ar— represents an aromatic radical with up to 4 substituents, preferably with a maximum of 2 substituents, and
n denotes a whole number from 10 to 1000.

Unsubstituated para-phenylene sulphides are particularly suitable (see, for example, U.S. Pat. No. 3,354,129 and EP-OS 0,171,021 and the literature referred to in EP-OS 0,171,021).

Moreover, polyarylene sulphones as described, for example, in U.S. Pat. No. 3,264,536 are preferred.

Moveover, thermoplastic polyphenylene oxides are preferred, poly(2,4-dialkyl-1,4-phenylene oxides) as described, for example, in DE-OS 2,126,434 or U.S. Pat. No. 3,306,875 being particularly preferred.

Moreover aromatic polyether ketones as described, for example, in U.S. Pat. No. 4,113,699, EP 135,938 and DOS 2,340,396 are preferred.

Vinyl copolymers and/or graft copolymers are moreover preferred. Polymers of this type are understood to include resin-like polymers or copolymers of styrenes, α-methylstyrenes, acrylonitrile, methacrylonitrile, esters of (meth)acrylic acid, vinyl-$C_1$-$C_4$-carboxylic acids or mixtures of these monomers with limiting viscosities between 0.3 and 1.5 dl/g (measured in toluene at 23° C.). Copolymers which are particulary preferred are those from styrene or α-methylstyrene with acrylonitrile, which optionally contain up to 40% by weight of esters of (meth)acrylic acid, particularly methyl methacrylate or n-butyl acrylate. These vinyl polymers are obtained by customary processes such as radical polymerization in bulk, solution, suspension or emulsion, most preferably, however, by radical emulsion polymerization in water. Further, graft copolymers produced from these from monomers, grafted onto rubbers with glass transition temperatures below 0° C., are preferred (see, for example, B. J. Schmitt, Ber. Bunsenges Phys. Chem 89, p. 1143, left-hand column (1985)).

Further, polyamides are preferably used, particularly polamide-6, polyamide-6,6 and partially crystalline copolyamides based on both of these components. Further, amorphous polyamides are preferred, which are obtained by polycondensation from diamines with dicarboxylic acids.

Other preferred polymers for the process according to the invention are aromatic polycarbonates based on the diphenols of the general formula (II)

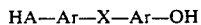   (II)

in which

Ar represents an optionally substituted aromatic radical,

X represents an alkylene radical or an alkylidene radical with 1 to 30, preferably 1 to 20 carbon atoms or —S—, —SO$_2$—, —CO—, —O—, preferably —S—, —CO— or —O—.

Polycarbonates of this kind are known in the literature or can be produced by processes known in the literature (see, for example, H. Schnell, Chemistry and Physics of Polycarbonates, Interscience Publ., New York, 1964).

Polycarbonates which are particularly preferred are those which contain at least 5 mol %, relative to the sum total of the diphenols used, of diphenols from the following list:

—4,4'-dihydroxyphenyl,
—2,2-bis(4-hydroxyphenyl)propane,
—1,1-bis(4-hydroxyphenyl)cyclohexane,
—2,2-bis(3,5-dimethyl-4-hydroxyphenyl) propane.

Further, siloxane-copolycarbonates based on the polycarbonate and polyether imides described above are preferred.

The following can be used in the process according to the invention and are particularly preferred:

polycarbonate based on 2,2-bis(4-hydroxyphenyl)-propane, polystryrene, polyvinyl chloride, polyethylene terephthalate, poly(para-phenylene sulphide), polyamide-6, polyamide-6,6 and polymethyl methacrylate.

At least two polymers which are not completely miscible in the melt under customary conditions are mixed with each other by the process according to the invention. It is also possible to blend three or more polymers together to form a highly dispersed mixture. Which polymers are mixed with each other and in what quantities, essentially depends on the subsequent field of application of the mixtures according to the invention.

The polymers can be mixed with each other in any desired ratio by weight. With a two-component mixture the two componets may be blended in a ratio by weight of 99:1 to 1:99. Preferably the two components are blended together in a ratio of 20:80 to 80:20, most preferably 25:75 to 75:25. The preferred mixing ratio of the polymers with each other is essentially governed by the subsequent field of application of the mixtures according to the invention and can accordingly be easily determined and adjusted.

It is obviously also possible to add to the polymers which are to be mixed, customary inorganic and organic additives, such as fibres made of glass, of plastic and/or of polymers, additionally carbon black, tatanium dioxide, barium sulphate, cross-linked elastomers, stabilizers and/or dopants, such as AsF$_5$, chlorine, iodine, bromine, potassium, and sodium, as well as ruthenium tetrachloride. The type and quantity of additives is governed by the desired intended use in each case of the mixtures according to the invention and can easily be established using relevant preliminary experiments. Normally, the additives are added to the polymers in a quantity of about 0.1 to 90% by weight, preferably 1 to 50% by weight, relative to the total weight.

As mentioned, the polymers to be used according to the invention are not to be completely miscible with each other under customary conditions. Customary conditions are understood to mean principally conditions under which the polymers are present in the melt and are mixed there, i.e. at temperatures of about 100° to 430° C.

By the process according to the invention, the polymers used are initially melted in the presence of supercritical gases or mixtures of gases. Gases which may be used as supercritical gases by the process according to the invention are those gases whose critical points are in a range which can be reached under the conditions of the process, i.e. critical temperatures below 400° C., preferably between −50° C. and 350° C., most preferably between 10° C. and 250° C. and which have critical pressures below 500 bar, preferably between 0.5 and 400 bar, most preferably between 1 and 300 bar. Those suitable as gases of this type are therefore particularly carbon dioxide, nitrous oxide, methane, nitrogen, propane, difluorochloromethane, trifluoromethane, ethane and/or sulphur dioxide. Those preferably used are: carbon dioxide, sulphur dioxide, propane, ethane and-/or triflouromethane most preferably carbon dioxide and/or sulphur dioxide.

The supercritical gas conditions, under which the process according to the invention is operated, are, for example, explained in David C. Bonner, Polym. Eng. Sci. 17 (1977), p. 65–72 or in S. K. Kumar et al., Macromolecular 20 (1987), p. 2550 et seq.

The quantity of supercritical gases or mixtures of gases which are to be used are essentially governed by the different solubility for each gas in the polymer mixture under consideration and is normally about 0.05 to 20, preferably 0.1 to 12% by weight, relative to the total weight of the mixture.

The molten polymers are intensively thoroughly mixed particularly by stirring for long enough until the viscosity of the polymer melt has diminished by at least 10%, preferably 20%, most preferably by 50% in relation to the initial melt viscosity.

Subsequently the polymer melt is cooled with further intensive thorough mixing, until the viscosity of the polymer melt has again reached at least the original value, i.e. the initial melt viscosity.

The time for the cooling process is governed here according to the particular polymer used in each case by the period of time necessary for saturation of the mixture with the supercritical gas used, it being possible for the cooling time during which mixing is proceeding, to amount to between 1 to 100% of this period of time, preferably 5 to 100%. Normally, this corresponds to times of between 0.5 sec and 300 min, preferably between 10 min and 280 min.

Obviously, it is also possible by the process according to the invention to cool the polymer melt long enough while mixing thoroughly until the viscosity of the melt has exceeded the original value. For example, the original viscosity may here be exceeded by about 100 to 200%.

After the polymer melt has again reached at least the value of the original viscosity, the melt is depressurized in a suitable manner. A highly dispersed mixture of polymers which are not completely miscible under customary conditions is obtained. According to the invention, a mixture is regarded as "highly dispersed" which in DSC measurements or TMA measurements, exhibits either markedly broadened glass transitions, perhaps additionally closer together on the temperature scale, or only a single glass transition, when with the conventionally produced molten mixture by comparison, narrow and separate glass transition steps are visible.

The process according to the invention for the production of highly dispersed mixtures can be carried out, for example, in the following manner in general terms (demonstrated using a mixture of 2 thermoplastics):

Initially the two thermoplastics in the form of granules, for example, are heated above their two softening temperatures. Subsequently, however, optionally also even during the heating, the supercritical gas or mixture of gases is introduced, the temperature and pressure here being adjusted in such a way that the gas or mixture of gases is present under supercritical conditions After heating, the mechanical mixing—for example by shearing, stirring, or kneading—can be commenced. As soon as the viscosity has diminished by about 10% of the original value, cooling of the melt can be commenced. The cooling times which are necessary to reach the reduced final temperature depend on the intensity of the mechanical working of the melt and on the polymers and gases used. The melt is now cooled sufficiently with constant stirring until the viscosity has at least reached the original value again. Subsequently the melt is depressurized. The depressurized melt can then be further processed in the customary manner, for example into mouldings.

The highly dispersed mixtures produced by the process according to the invention can be processed in the customary manner into mouldings, for example by injection moulding. It is also possible to process the said mixture into sheetings, fibres, films and filaments.

EXAMPLES a) Substances used:

PMMA = polymethyl methacrylate V 811 supplied by Rohm & Haas, having a glass temperature of 106° C., measured by the DSC method at a heating rate of 20 K/min.

PC = polycarbonate made from bisphenol A having a relative solution viscosity, measured in methylene chloride at room temperature and a polymer concentration of 0.5 g/dl, of 1.28 with a glass transition temperature of 146° C., measured by the DSC method at a heating rate of 20 K/min.

b) Comparative examples:

These comparative examples are intended to make plain that—without the presence of supercritical gases and without the process according to the invention being used—the fine dispersion cannot be achieved without additional disadvantages:

1. Comparative example:

A mixture of 300 g of PC and 700 g of PMMA is intensively mechanically mixed at 263.5° C. without the presence of supercritical gases for 1 hour. Here, a vessel with stirrers to which a high turning moment can be applied, is used. After this mixing time the melt is rapidly cooled and a sample withdrawn. The sample showed slight yellowing. In the DSC, the presence of two distinct phases, characterized by two separate, relatively narrow glass transitions at 115° C. and 145° C. was recorded.

2. Comparative example:

700 g of PMMA and 300 g of PC were melted at 263.5° C. as in Comparative Example 1 in the same vessel. This time during the thorough mixing carbon dioxide at atmospheric pressure was present in the gas space of the mixing vessel. During the mixing process an attempt was made to reduce the mixing temperature. At 253° C. the mixing process had to be terminated despite powerful stirring because of the high viscosity. The melt was rapidly cooled and a sample withdrawn, which as in Comparative Example 1, had two separate, relatively narrow glass transitions (measured by the DSC method at a heating rate of 20 K/min)—this time at 114.5° C. and 144° C.

c) Examples according to the invention:

These examples are intended to establish that a fine dispersion can be achieved with the process according to the invention.

1. Example:

700 g of PMMA and 300 g of PC were introduced into a closed 3-liter vessel, which is equipped with a stirrer. Subsequently $CO_2$ was introduced over 3 minutes, until a pressure in the gas space of the stirrer vessel, measured with a pressure manometer, of 10 bar was reached. Subsequently, over 5 minutes, the $CO_2$ pressure was adjusted to 270 bar and the temperature was adjusted to 264° C. with constant introduction of $CO_2$ and simultaneous heating of the inside of the vessel. After reaching this temperature, the mixing process was started and the turning moment of the stirrer measured at the beginning. After about 5 minutes a diminution in viscosity—monitored by the reduction of the turning moment of the stirrer—of more than about 22% of the original viscosity at the temperature of 264° C. was achieved. Within a further period of about 50 minutes the vessel was brought with constant stirring to a temperature of 200° C., the viscosity having meanwhile reached the original viscosity (Angular momentum-monitoring).

Subsequently the experiment was terminated and a sample was removed from the cooled and depressurized vessel. This sample was not yellowish in colour and showed a significantly improved dispersion in the DSC, characterized by glass transitions at 116° C. and 142° C. which had broadened by about 50% in comparison with Example 1.

2. Example:

PMMA and PC were mixed as in Example 1 with the same temperature and pressure control and in the same composition. After reaching the mixing temperature of 200° C.—as described in Example 1—the mixture was continuously cooled to 124° C. within a further 60 minutes with constant stirring. The monitoring of the turning moment of the stirrer gave at this moment a viscosity which had increased by about 30% in relation to the original viscosity.

The experiment was subsequently terminated and a sample—as in Example 1—withdrawn.

The sample was not yellowish in colour and showed the finest dispersion in the DSC, characterized by a single—in contrast with Comparative Example 1—glass transition at about 123° C. which had broadened by about 20%.

We claim:

1. Process for the production of highly dispersed mixtures of at least two polymers which are not completely miscible in the melt under customary conditions, characterized in that the polymers used are melted in the presence of supercritical gases or mixtures of gases, the molten polymers are intensively thoroughly mixed for long enough until the viscosity of the melt has diminished by at least 10%, the polymer melt is subsequently cooled with further thorough mixing, until the viscosity of the melt has at least reached the original value again and then the polymer melt is depressurized.

2. Process according to claim 1, characterized in that the gases or mixtures of gases used as supercritical gases or mixtures of gases have a critical temperature of less than 400° C. and a critical pressure of less than 500 bar.

3. Process according to claim 1 characterized in that carbon dioxide, sulphur dioxide, propane, ethane and/or trifluoromethane are used as supercritical gases.

4. Process according to claim 1 characterized in that the molten polymers are intensively thoroughly mixed for long enough until the viscosity of the melt has diminished by at least 20% in relation to the initial melt viscosity.

* * * * *